Jan. 23, 1962 A. BALTAC 3,017,940
TORSION BALANCE FOR THE DETERMINATION OF SMALL
VARIATIONS OF THE APPARENT WEIGHT OF SAMPLES
Filed Aug. 28, 1959
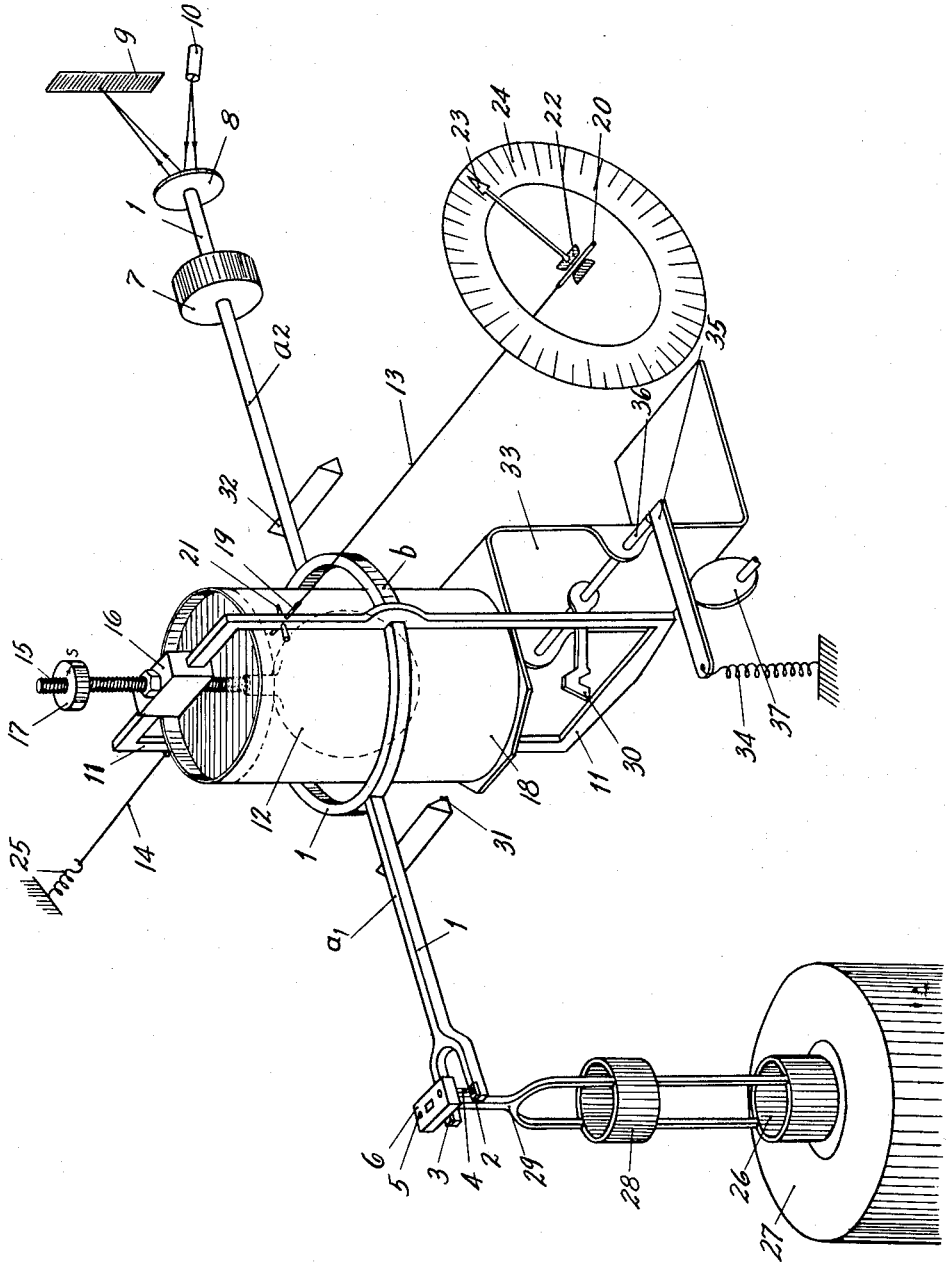
INVENTOR.
ALEXANDRU BALTAC
BY HIS ATTORNEY

United States Patent Office

3,017,940
Patented Jan. 23, 1962

3,017,940
TORSION BALANCE FOR THE DETERMINATION OF SMALL VARIATIONS OF THE APPARENT WEIGHT OF SAMPLES
Alexandru Baltac, Bucharest, Rumania, assignor to Ministry for Petroleum Industry and Chemistry, Bucharest, Rumania
Filed Aug. 28, 1959, Ser. No. 836,676
3 Claims. (Cl. 177—246)

The present invention refers itself to a torsion balance intended to be utilized for the precise determination of the small variations of the apparent weight of the studied samples, as are for instance the variations owed to the electromagnetic susceptibility of rocks, the variation of the Archimedean lift, which acts upon the bodies in a gaseous atmosphere, the weight of the water lost by the dehydration of the samples, the weight of the gases absorbed by the samples, etc.

Special microbalances are usually utilized for this purpose, the variations of the weight being obtained by subtracting the results of two very accurate weighings. Often each weighing must be executed with a relative error of 0.001% and even less, to obtain a final result with errors over 1–2%.

The microbalances suited for such weighings are expensive apparatus, fragile, difficult to obtain, and whose handling need qualified workmanship, and the determination made with them need much time.

For the same purpose torsion balances can be used, which have the advantage to indicate directly the measured difference. The usual torsion balances are not however recommended for such purposes, because they have a relative small loading capacity, and although their sensibility may be great, the forces which have to be measured in the case of the samples whom the balance supports, are too small to be measured even with a torsion balance of great sensibility.

The torsion balance of the present invention, suppresses the shown disadvantages, by that that the mobile element is provided with a float, dipped into a liquid which overtakes the whole weight of the mobile element, inclusive the weight of the sample, so that the torsion thread overtakes only the very small torsion, which must be measured. The torsion thread being discharged of the weight of the mobile element and of the sample, can be very thin, and the sensibility of the balance very high, because it is independent of the loading capacity of the balance. To realize the maximum sensibility, the righting couple formed by the weight of the mobile element and the Archimedes' force is reduced practically to zero, by bringing into coincidence the center of pressure and the center of gravity of the mobile element.

An example of the application of this invention is described further on, related to the drawing, which represents a schematic view of the balance, applied to the determination of the magnetic susceptibility of rocks.

The balance of this invention comprises a mobile element formed of a lever (1) with two arms $a_1$ and $a_2$, one in prolongation of the other, forming a unitary rigid piece by means of a central ring $b$, the axis of the arms $a_1$ and $a_2$ passing through the center of ring $b$. At the extremity of arm $a_1$ are placed two small plates 2 and 3, of hard material, provided with conic locatings in which enter the tips 4 and 5, by which the suspension system 6 of the sample rests on arm $a_1$ of the balance. On the other arm $a_2$ of the lever 1 a counter-weight 7 can glide. Lever 1 is provided with an indicator of the zero position, for instance a concave mirror 8 fixed on the end of arm $a_2$ of lever 1. The concave mirror 8 sends upon a graduated scale 9 the light spot emitted by lamp 10.

In the diametrical vertical plan, perpendicular on the arms of the balance, is fixed to ring $b$ of lever 1 a vertical rectangular frame 11 which realizes the connexion between the mobile element and the suspension elements: float 12, torsion thread 13 and the extension thread 14.

The float is brought to the right level by screwing a threaded rod 15, into a threaded piece 16, of frame 11, being fixed in this position by a nut. On the same threaded rod 15 a weight 17 is placed which helps the delicate adjustment of the height of the mobile elements center of gravity. To mark exactly the position of weight 17, this one is provided with a mark (an arrow $s$).

Float 12 is completely plunged in the liquid placed in a container 18, liquid which fulfills also the function of reducing the oscillations of the mobile element. If the float is fragile, the threaded rod 15 must be tubular, to render the pressures uniform.

The torsion thread 13 is provided with two mountings (studs) 19 and 20. Mounting 19 is fixed upon the vertical frame 11, by means of a conic pin 21, as for mounting 20 it is fastened in a mandrel 22 which has fixed on it an indicator 23 for the angle of torsion. Indicator 23 can be a vernier which moves in front of a graduated disc 24.

The extension thread 14 maintains the torsion thread 13 stretched with a given constant force by a soft spring 25.

Both threads 13 and 14 are in the same horizontal plan, at the level of the liquids meniscus in container 18, the axis of the threads passing through the center of the wet perimeter of the threaded rod 15, disposition which has the effect of reducing to their minimum the errors owed to the moment of the surface tension forces.

For the weighing the balance is provided with a scalepan 26, which can be simple or of a double-staged depending upon the destination of the balance. If the balance is utilized for the measuring of the magnetic susceptibility the scalepan is double-staged, namely: the sample is placed on the lower plate 26, in the magnetic field of a coil 27, and on the upper plate 28, placed sufficiently far away from coil 27, practically non-magnetic ballast is added, until the weight of the mobile element is completed up to the necessary value, corresponding to the volume of float 12 and of the density of the liquid in the container 18.

Both stages 26 and 28 are mounted on the same support 29 which is fixed on the suspension system 6 of the sample.

The balance of this invention is provided with a blocking (braking) mechanism composed of a lever 30 which presses the mobile element and fits it upon two edges 31 and 32, the lever 30 being sustained by the support 33 of the liquid container 18. The pressing force of lever 30 on frame 11 is maintained at a constant value by a spring 34. It is transmitted by handle 35 and an axis 36 to lever 30, the pressing force being thus independent of the effort made by the operator to manipulate the blocking cam 37.

The initial regulating method to reduce to the minimum the righting couple for a certain constant weight, according to the invention, is the following:

Weight 17 is lifted towards the upper part of the threaded rod 15 and float 12 is lowered, screwing the threaded rod 15 into the threaded piece 16, until by lowering the center of pressure under the center of gravity a reversal couple is obtained which brings the mobile element out of position zero. The presence of the reversal couple is proved by the instability of the position "zero"

of the mobile element, when by the softest torsion, continuous and uniform of the torsion thread or by the slowest displacing of counter-weight 7, the mobile element passes suddenly through the position "zero," and cannot be stopped in this position.

Float 12 is then lifted little by little by unscrewing the threaded rod 15, until the stability of the positions of the mobile element is reached; the existence of the righting couple is proved by that that for each position of the counterweight and for each angle of torsion of the thread 13 corresponds a certain position of the mobile element, one of these positions being also the position "zero."

After the first stable position is obtained, rod 15 is screwed down again until an unstable position is reached once more. Rod 15 is blocked in this position by the counter-nut.

Then the fine regulation is started, twisting weight 17, using as regulation criterion again the stability or unstability of position "zero," until the difference between is hardly perceived. In this situation the weight of the mobile element, so as the Archimedean force have their application points on a straight line parallel to the threads 13 and 14, the righting couple is at its minimum—owing to the torsion thread—and the sensibility of the balance is at its maximum.

For the execution of the determination the sample which has to be studied is placed on the plate 26 of the balance. The weight of the sample is completed on the plate 28, up to the constant weight characteristic of the apparatus, determinated by the volume of the float, the density of the liquid the mass of the mobile element in absence, so as the own mass of the counter-weight 7. To complete the weight of the sample can be used either a usual laboratory balance of medium sensibility, either directly the torsion balance, which begins to oscillate free only when the weight on the plate becomes approximatively equal to the imposed weight. After the weight has thus been completed on the plate, up to the imposed weight, the torsion thread 13 is twisted, so that the mobile element reaches the position "zero" and the respective indication on the graduated disc is noted.

Afterwards a magnetic field is created by passing an electric current through the coil 27, which, owing to the magnetic susceptibility of the sample from the plate 26, determines the mobile element to leave the position "zero." To bring it again in this position, the torsion thread 13 is once more twisted. The new indication on the graduated disc 24 is noted. The result obtained subtracting the two indications gives the force which has to be measured. The balance is calibrated by comparison with marked weight (milligrammes).

The balance of the present invention offers the following advantages: it has all the advantages of the torsion balances, namely a high sensibility and convenient reading, having moreover a greater loading capacity (over 10 gr.); it secures the realization of a high sensibility (smallest righting couple) by a simple initial regulation without specially precise execution of the component parts; the oscillations of the mobile element of the balance are very well dampened; the critical dampening can easily be realized, choosing the most favourable viscosity of the liquid of changing the dimensions of container 18; the liquid used for the float may be an oil with a very low vapor pressure which allows the adaptation of the balance for measurements under vacuum.

It can replace the balances of high precision when small variations of the samples weight are studied, having towards these the following advantages: a smaller cost price; its handling is easier, quicker and more convenient; it indicates directly the unbalance force which appears in the course of the operations, the reading being made directly on a graduated dial.

I claim:

1. A torsion balance for the determination of small changes in weight of samples under test comprising oscillatable mobile elements, a suspension system for the sample under test carried by said elements, a counterweight for balancing said suspension system and the sample under test carried by said elements and a horizontal torsion thread attached to said elements subject to oscillations thereof, in combination with a fixed container, a body of liquid in said container, a float submerged in said body of liquid, and an adjustable rod connected to said float extending upwardly therefrom and connected to said elements to support them from the submerged float, the center of gravity of said elements, the suspension system and the counterweight being substantially at the center of bouyancy of said float, and the free surface of said liquid being at the level of the point of attachment of said torsion thread to said elements, whereby said torsion thread is not subject to the weight of said elements, said suspension system and said counterweight.

2. A torsion balance according to claim 1, wherein said oscillatable mobile elements comprise a horizontal ring surrounding said container spaced therefrom, a vertical frame fixed to said ring at right angles to the arms of the balance and surrounding said container spaced therefrom, the upper part of said frame being tapped to receive a threaded section of said adjustable rod, said torsion thread being attached at one end to said frame, an extension thread attached at one end to said frame opposite to the attachment of said torsion thread extending coaxially with said torsion thread, and a fixed spring connected with the opposite end of said extension thread, the line defined by said threads passing through said adjustable rod.

3. A torsion balance according to claim 1, wherein said oscillatable mobile elements, said suspension system and said counterweight are formed of non-magnetic and non-conductive material, an electromagnet is positioned coaxially with said suspension system, and said suspension system includes a scale pan in the magnetic field of said electromagnet for the material under test and a second scale pan beyond said first-named scale pan for receipt of non-magnetic non-conductive ballast to increase the weight on said suspension system to the constant weight indicated by lifting of said float.

References Cited in the file of this patent

UNITED STATES PATENTS

| | | |
|---|---|---|
| 400,663 | Gripperich | Apr. 2, 1889 |
| 2,407,580 | Scott | Sept. 10, 1946 |
| 2,417,392 | Craig et al. | Mar. 11, 1947 |
| 2,668,044 | Green | Feb. 2, 1954 |

OTHER REFERENCES

The Review of Scientific Instruments, volume 20, number 7; July 1949, pp. 489–491.